(12) United States Patent
Bachmann et al.

(10) Patent No.: US 9,128,184 B1
(45) Date of Patent: Sep. 8, 2015

(54) RADAR WIND TURBINE

(71) Applicant: Lockheed Martin Corporation, Bethesda, MD (US)

(72) Inventors: Svetlana M. Bachmann, Liverpool, NY (US); Elliott Reitz, Liverpool, NY (US)

(73) Assignee: Lockheed Martin Corporation, Bethesda, MD (US)

(*) Notice: Subject to any disclaimer, the term of this patent is extended or adjusted under 35 U.S.C. 154(b) by 348 days.

(21) Appl. No.: 13/803,264

(22) Filed: Mar. 14, 2013

(51) Int. Cl.
| | | |
|---|---|---|
| *F03D 7/00* | (2006.01) | |
| *F03D 9/00* | (2006.01) | |
| *G01S 13/62* | (2006.01) | |
| *G01S 13/95* | (2006.01) | |
| *F03D 11/00* | (2006.01) | |
| *F03D 7/02* | (2006.01) | |
| *H01Q 1/12* | (2006.01) | |

(52) U.S. Cl.
CPC ............ *G01S 13/62* (2013.01); *F03D 11/0033* (2013.01); *F03D 11/0041* (2013.01); *G01S 13/95* (2013.01); *G01S 13/951* (2013.01); *F03D 7/0264* (2013.01); *F03D 7/0268* (2013.01); *F03D 9/002* (2013.01); *G01S 13/956* (2013.01); *H01Q 1/12* (2013.01)

(58) Field of Classification Search
CPC ......... G01S 13/04; G01S 13/06; G01S 13/56; G01S 13/88; G01S 13/95; G01S 13/951; G01S 13/956; H01Q 1/12; H01Q 1/18; H01Q 1/27; H01Q 1/42; F03D 7/0264; F03D 7/0268; F03D 7/0208; F03D 9/002–9/005; F03D 11/00; F03D 11/0025; F03D 11/0033

USPC .......... 342/26 R, 26 D, 27, 28, 175; 343/872, 343/890; 416/1, 31, 36, 37, 61
See application file for complete search history.

(56) References Cited

U.S. PATENT DOCUMENTS

| | | | | |
|---|---|---|---|---|
| 4,651,017 | A | * | 3/1987 | Longrigg ..................... 290/44 |
| 4,737,788 | A | * | 4/1988 | Kennedy ..................... 342/29 |
| 5,017,922 | A | * | 5/1991 | Klausing et al. ............. 342/25 F |
| 6,320,272 | B1 | * | 11/2001 | Lading et al. ................. 290/44 |
| 7,002,508 | B2 | * | 2/2006 | Wolframm et al. ......... 342/25 R |

(Continued)

OTHER PUBLICATIONS

Fenn, A.J., "Near-Field Testing fo Adaptive Radar Systems", The Lincoln Laboratory Journal, vol. 3, No. 1, pp. 23-40, (1990).

(Continued)

*Primary Examiner* — Peter Bythrow
(74) *Attorney, Agent, or Firm* — Howard IP Law Group, PC

(57) ABSTRACT

A blade mounted radar system comprises a wind turbine having a hub and blades extending therefrom; a radar antenna configured to transmit and/or receive a radio frequency (RF) signal; and a processor in electrical communication with the radar antenna and configured to generate the RF signal for transmission and/or to process the received RF signal. The radar antenna is affixed to one of the blades of the wind turbine such that relative motion is defined between the radar antenna and a target within a line of sight of the radar antenna. The problem of the ground based radar line of sight being obscured by the wind turbine is mitigated in this setup, as radar and turbine coexist in the same structure. Improved performance and additional capability are enabled by elevated installation and vertical SAR imaging capability. Doppler capabilities are extended using known motion of the antenna relative to stationary objects.

24 Claims, 6 Drawing Sheets

(56) References Cited

U.S. PATENT DOCUMENTS

| | | | |
|---|---|---|---|
| 7,083,384 B2 | 8/2006 | Bosselmann et al. | |
| 7,281,891 B2* | 10/2007 | Smith et al. | 415/4.3 |
| 7,503,752 B2 | 3/2009 | Gunneskov et al. | |
| 7,528,762 B2* | 5/2009 | Cerwin | 342/22 |
| 7,675,458 B2 | 3/2010 | Hubbard et al. | |
| 7,950,901 B2* | 5/2011 | Barbu et al. | 416/1 |
| 8,131,402 B2* | 3/2012 | Neumann | 700/287 |
| 8,319,361 B2* | 11/2012 | Lucks | 290/44 |
| 8,482,435 B2* | 7/2013 | Wobben | 340/983 |
| 2002/0067274 A1* | 6/2002 | Haller | 340/601 |
| 2006/0049302 A1* | 3/2006 | Kennedy et al. | 244/17.11 |
| 2006/0115360 A1* | 6/2006 | Bosselmann et al. | 416/146 R |
| 2006/0140764 A1* | 6/2006 | Smith et al. | 416/103 |
| 2008/0101930 A1* | 5/2008 | Bosche | 416/31 |
| 2009/0008939 A1 | 1/2009 | Pare et al. | |
| 2009/0034259 A1* | 2/2009 | Laufer | 362/253 |
| 2009/0185900 A1* | 7/2009 | Hirakata et al. | 416/1 |
| 2009/0202347 A1* | 8/2009 | Rugger | 416/31 |
| 2010/0032948 A1 | 2/2010 | Bevirt | |
| 2010/0133848 A1* | 6/2010 | Piasecki | 290/55 |
| 2010/0166567 A1 | 7/2010 | Calley | |
| 2010/0183440 A1* | 7/2010 | Von Mutius et al. | 416/1 |
| 2010/0219645 A1* | 9/2010 | Yamamoto et al. | 290/55 |
| 2010/0265122 A1 | 10/2010 | Oswald | |
| 2010/0329864 A1 | 12/2010 | Volanthen | |
| 2011/0084486 A1* | 4/2011 | Yoneda et al. | 290/44 |
| 2011/0135466 A1* | 6/2011 | Latorre et al. | 416/1 |
| 2012/0280857 A1* | 11/2012 | Elder | 342/26 B |
| 2013/0052010 A1* | 2/2013 | Nielsen et al. | 416/1 |
| 2014/0140808 A1* | 5/2014 | Duncan et al. | 415/1 |
| 2014/0266861 A1* | 9/2014 | Egedal et al. | 342/118 |
| 2014/0327569 A1* | 11/2014 | Fun et al. | 342/26 D |

OTHER PUBLICATIONS

"2 Federal Agency Needs That Radar Can Meet", 16 pages, http://www.ofcm.gov/r25-mpar/pdf/02-ch2.pdf; Federal R & D Needs and Priorities for MPAR, Aug. 24, 2006.

"Wind Farms and Radar", JASON, JSR-08-125, 18 pages, Jan. 2008, http://www.fas.org/irp/agency/dod/jason/wind.pdf.

* cited by examiner

RADAR WIND TURBINE

FIELD OF THE INVENTION

This application relates generally to radar imaging systems.

BACKGROUND OF THE INVENTION

With an increased focus on green energy production in recent years, more wind turbines or windmills are being installed to harness wind energy. Many modern wind turbines include blades having lengths in the range of about twenty-five (25) meters (m) to about ninety-nine (99) m. Furthermore, such blades are rotatably mounted on a mast whose height may range from about eighty (80) m to about one hundred and twenty (120) m. During conditions where sufficient wind is present to turn the blades, the blades rotate a turbine attached to an electric generator to create electrical power. This power may be used to supply additional electric power to the distribution grid, or may be used directly by the wind turbine owner. As the demand for renewable energy sources increases, the need for a greater number of wind turbines will increase. Multiple wind turbines are sometimes installed across expansive open areas grouped in wind farms to harness the power of the wind and convert it to electrical energy.

Ground based radars are a primary source of information regarding atmospheric conditions, location and quantity of water and/or ice, as well as other objects in the atmosphere. Existing ground based radar applications must meet certain criteria such as coverage, accuracy, latency, scan rate, reliability and resolution. Currently, ground based radars serve as a key component of national surveillance systems that detect and track objects operating in the nation's airspace. In addition to applications in the defense industry, radar fulfills various civilian requirements. These civilian applications include but are not limited to air traffic control, weather surveillance and tracking, tracking airborne releases of toxic materials, calibration of satellite-based instruments, observing debris flow from disasters such as mudslides and floods, monitoring air quality, monitoring movement of volcanic ash, and detecting birds and other aviation hazards.

Radar operates within its line of sight. Electromagnetic radio frequency waves are transmitted by a radar sensor configured to transmit and receive the electromagnetic waves. The waves propagate through the air until they contact an object. When the waves are impinged by an object, the waves are reflected back toward the transmission source. The radar sensor receives the reflected echo waves. Based on the time it takes for the wave to travel to the object and be reflected back to the sensor, the round trip time of the wave may be calculated based on the speed of the electromagnetic wave, which is substantially equal to the speed of light.

Doppler radar is used to detect objects which are moving with respect to the object's background. For example, Doppler radar is effective for tracking storm systems as they move across a terrain. Doppler radar determines the range and velocity of a target object based on the Doppler effect. As the electromagnetic waves of the radar impinge a moving target, the frequency of the echo (reflected) wave is altered based on the object's direction and speed of motion. For example, an object approaching a radar sensor generates a reflected wave at a frequency higher than that of the transmitted wave. An object moving away from the radar sensor generates a reflected wave at a frequency lower than the transmitted wave.

Wind turbines interfere with radar, particularly Doppler radar because of the time variable signatures generated by the rotating blades. The interference caused by wind turbines creates blind spots in the radar coverage when a wind turbine is installed in the line of sight of the radar installation. In the interest of national security, permission to install wind turbines in the line of sight of existing radar installations may be prohibited. Other remediation actions include additional processing intended to filter the wind turbine signature. However, such techniques risk corrupting the received data signal and may increase the likelihood that a threat will go undetected. Additionally, complex processing taxes the computer's resources and timelines available in existing legacy radar systems. Additional air traffic rules may be implemented in areas near or above wind turbines. However, such measures do not address the situation where an airborne object does not comply with air traffic regulations.

Improved radar systems that are not adversely affected by wind turbines are desired.

SUMMARY

According to an aspect of the disclosure, there is disclosed a wind-turbine having radomes with radar sensors installed on the wing-tips thereof. A wind-turbine radar arrangement according to one embodiment is intended to solve various radar return problems caused by time-variable return signatures of large wind turbines. Further, the wind-turbine may provide the power required to operate the integrated radar system. Moreover, a radar system integrated onto the wing tips of a wind-turbine may include a complement of various operating frequencies adapted to maximize coverage with simultaneous imaging and surveillance. Such a radar-wind turbine system may also enable ISAR (Inverse Synthetic Aperture Radar)/SAR (Synthetic Aperture Radar) imaging radar capabilities. Thus, there is disclosed a radar system comprising an antenna configured to transmit and/or receive a radio frequency (RF) signal; and a processor in electrical communication with the antenna and configured to generate an RF signal for transmission and/or to process a received RF signal; wherein the antenna is mounted to a blade of a wind turbine such that relative motion is defined between the antenna and a target within a line of sight of the antenna.

According to another aspect of the disclosure, the problem of the ground based radar line of sight being obscured by wind turbine is mitigated in embodiments disclosed herein, as radar and turbine coexist in the same structure. The improved performance and additional capability are enabled by one or more of a) the elevated installation turbine structures which are generally taller than radar towers; and b) vertical SAR imaging capability wherein signals are recorded at each blade-tip location and processed together for improved resolution. SAR imaging capability may be achieved from the rotation of the wind turbine blade. Since the radar located on the turbine tip is tracing a substantially circular path as blade rotates, high resolution imagery can be constructed.

High resolution imagery may be further extended by orienting the turbine and selecting the blade's rotation. This can be achieved via direct wind power or driven from external power when wind conditions are inadequate to drive the desired motion and steering of the wind turbine and propeller's motion. Doppler capability is extended by using the known motion of the antenna relative to stationary objects, including clouds and/or moisture that can be stationary relative to a typical stationary antenna.

DETAILED DESCRIPTION

It is to be understood that the figures and descriptions of the present invention have been simplified to illustrate elements that are relevant for a clear understanding of the present invention, while eliminating, for purposes of clarity, many other elements found in such wind turbine systems and radar systems. However, because such elements are well known in the art, and because they do not facilitate a better understanding of the present invention, a discussion of such elements is not provided herein. The disclosure herein is directed to all such variations and modifications known to those skilled in the art.

Figure 1A:
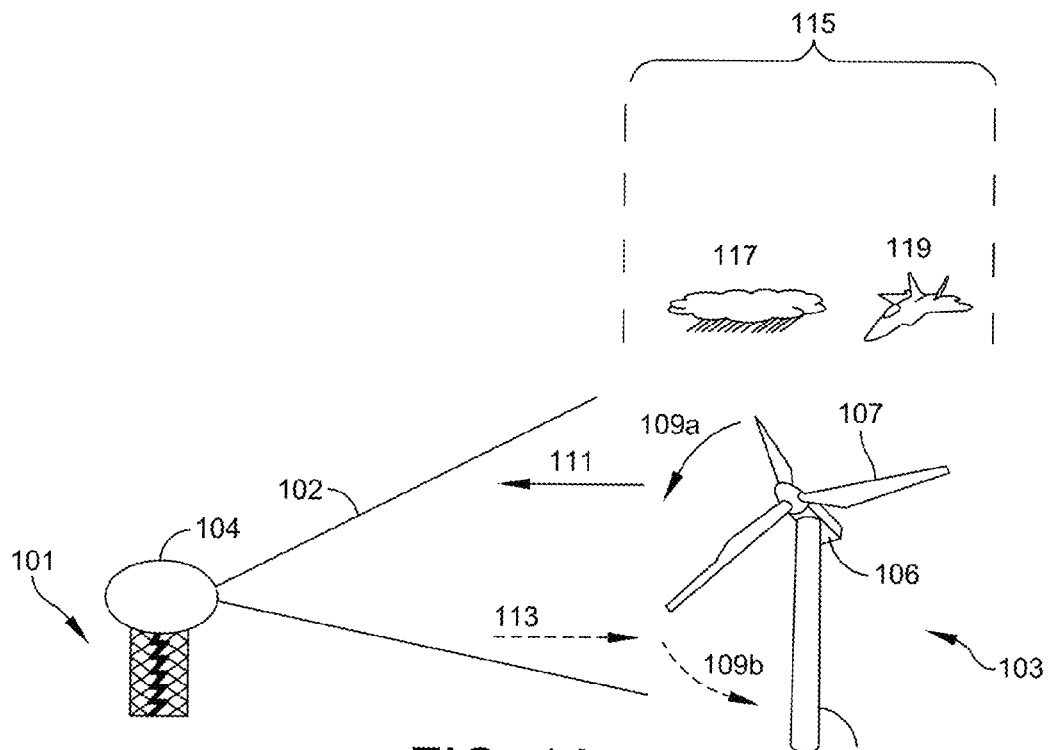
FIG. 1A is an illustration of a wind turbine operating within the line of sight of a radar installation.

Wind turbines operating within the line of sight of surveillance radar interfere with the radar. Referring to FIG. 1A, a radar installation 101 having a wind turbine 103 within its line of sight 102 is shown. The radar installation 101 includes a tower upon which the radar processing and antenna system is installed. The radar antenna or sensor may be covered with a protective radome to shield the radar 101 from the environment. The radar antenna 104 transmits and receives radio frequency (RF) electromagnetic waves in a line of sight 102 toward a target. The target may be any object within the line of sight 102 of the radar installation 101. For example, an aircraft 119, a moving storm system 117, or a wind turbine 103 among other detectable objects may be identified as potential targets. The wind turbine 103 is mounted on a vertical mast 105. Mounted upon the mast 105 is a nacelle 106 which houses the machinery and equipment needed to run the wind turbine 103 including an electric generator. The electric generator has a rotor which is rotated within a generator housing containing coiled conductors which generate electricity when the rotor is rotated within the housing coils. The rotor is coupled to a rotating blade 107 which is turned by the force of the wind striking the surface of the blade 107 and imparting a rotational force to the blade 107 with respect to its axis. A hub at the level of the blade 107 axis is coupled to a shaft connected to the rotor. When the wind is inadequate to produce sufficient force to turn the wind turbine electric generator 103, the generator may be used as a motor to turn the blade 107 using externally provided electricity (e.g. by applying an external source of electricity to the generator output terminals).

Due to the rotational characteristics of the wind turbine 103, the wind turbine 103 creates a variable time signature detected at radar installation 101. The blades 107 define a rotational direction 109a in the direction of the radar 101 as the blade 107 passes the topmost position relative to the blade assembly axis, and a rotational direction 109b in a direction away from the radar 101 as the blade passes the horizontal position and begins a downward arc towards the lowermost part of the rotational path. A Doppler radar which transmits signals that impinge the wind turbine 103 will detect reflections that indicate an incoming movement 111 and an outgoing movement 113 caused by the rotational motion of the blades 107. Furthermore, the radar 101 will detect a zero Doppler component of the reflected signals, due to signals that impinge the stationary mast 105 and are reflected back to the radar 101 receiver without any Doppler effect. The resulting ambiguities result in a blind spot 115 in which target objects such as an approaching storm 117 or aircraft 119 operating in the air space proximal to the wind turbine 103 may go undetected by radar 101. To maintain the effectiveness of a national radar surveillance system, the detrimental effects of wind turbines must be mitigated. Interference may be identified and attempts may be made to remove them from the received radar signal, but the algorithms needed to perform such interference filtering are complex and may exceed the processing capabilities of existing infrastructures. Preemptive measures, such as more tightly regulating airspace above wind farms, or disallowing further development of wind farms in locations that fall within the line of site of radar installations in the area have obvious negative consequences.

The wind turbine 103 may operate as a component of a wind farm, comprising a number of wind turbines 103 which are electrically interconnected between each other and a power grid. The power grid may, in turn, receive or provide power to other wind farms or other power sources. Other power sources may provide power through other means, such as nuclear, hydro-electric, fossil fuels, solar and the like.

Figure 1B:
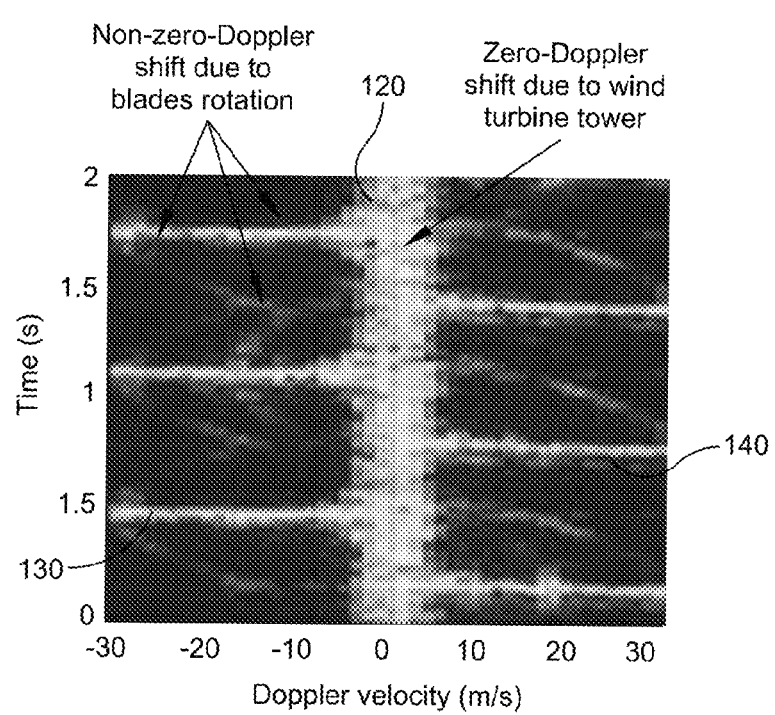
FIG. 1B shows a radar image indicating the time varying and constant components of a wind turbine signature.

FIG. 1B shows a radar image of radar reflections created by a wind turbine. At the center of the image, the zero Doppler portion of the reflection signature of the wind turbine may be seen 120. Time varying signatures may be seen in both the positive Doppler direction 130, and a negative Doppler direction 140, indicating relative motion between the rotating blades and radar sensor. The positive Doppler signatures occur when the blades are rotating in a direction toward the radar sensor, while the negative Doppler signatures 140 are representative of times when the blades are rotating away from the radar sensor.

Figure 2A:
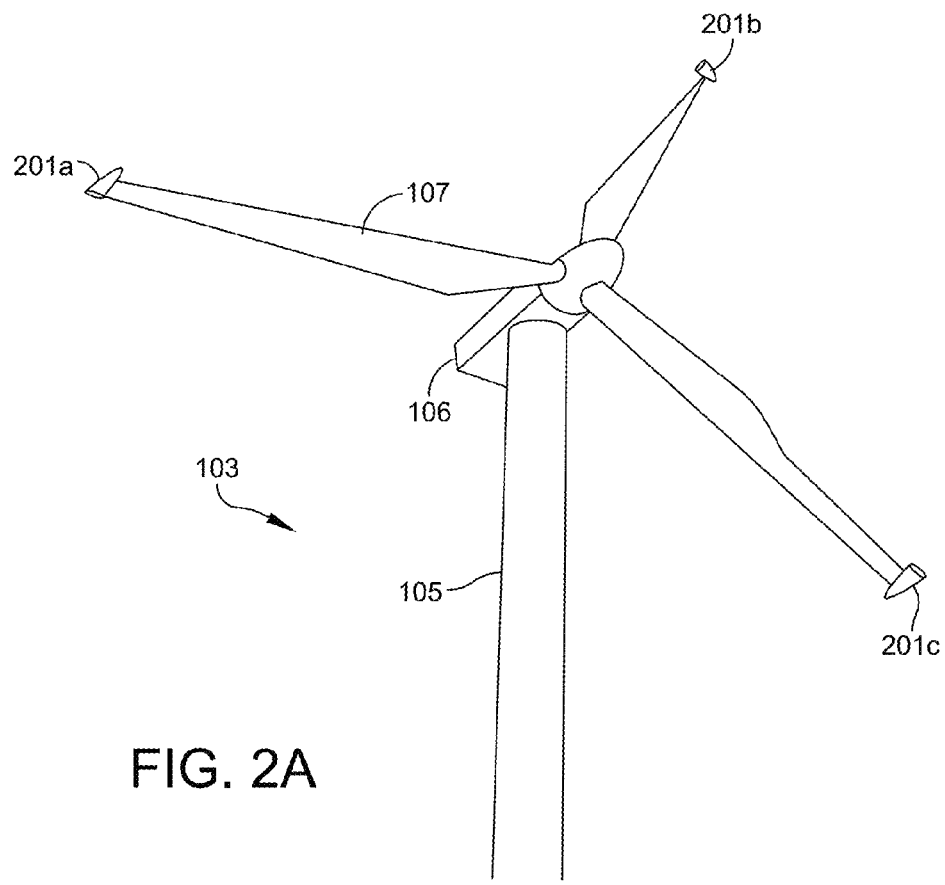
FIG. 2A shows a rotationally mounted radar system mounted on a wind turbine.
Figure 2B:
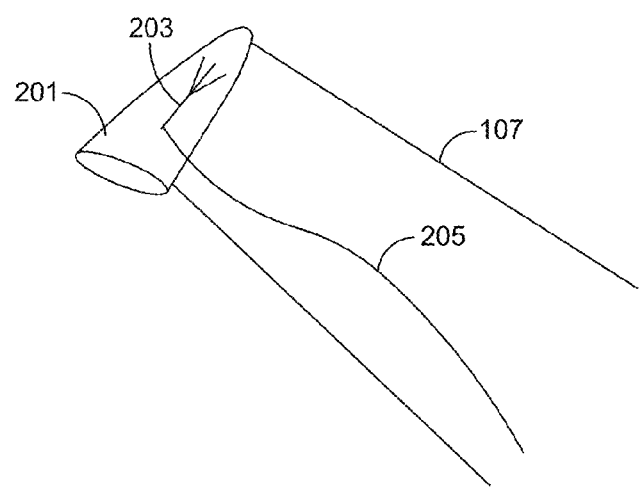
FIG. 2B shows a radar antenna mounted on a blade of a wind turbine in the radar system of FIG. 2B.

Referring to FIG. 2A, a radar system 200 according to an exemplary embodiment of a wind turbine mounted radar system is shown. Radar system 200 is mounted on a wind turbine 103 and functions as an integral part of the wind turbine 103 and performs as a rotatably mounted radar system. The wind turbine 103 is supported by a mast 105. A nacelle 106 is mounted atop mast 105. The nacelle 106 houses the internal machinery of the wind turbine 103. For example, the nacelle 106 may house an electric generator that generates electrical power when the blades 107 are rotated due to the force of the wind exerted on the blade 107 surface. Additional machinery may be housed in the nacelle 106. By way of example, motors which adjust the head of the wind turbine 103 in azimuth to position the blades 107 to face into the wind or control the pitch of the blades may be located within nacelle 106. Other control machinery which may be housed in the nacelle 106 includes but is not limited to, cabling, digital controllers and processors, control circuitry, voltage regulators, circuit breakers and other circuits or equipment necessary for operating the wind turbine 103.

Mounted at the tip of each blade 107, a radome denoted generally as 201 is installed. The radome 201 is configured and installed to be aerodynamically efficient with respect to the rotational direction of the blades 107. For example, radome 201 may be a radome configured for installation on the wing tip of an aircraft. A radar sensor 203 is installed within radome 201 which protects the radar sensor 203 from the force of the wind and the elements. The radar sensor 203 transmits and receives electromagnetic signals from the tip of the blade 107 as the blade 107 rotates. Accordingly, there is relative motion between the radar sensor 203 and a potential target as the radar sensor 203 rotates along with the turbine blade 107. The radar sensor 203 may be coupled to the radar system's processing modules by a cable 205 that may be guided through the interior of blade 107 under its skin. The cable 205 may be run through the blade 107 to the central hub of the blade assembly where the cable 205 may enter the nacelle 106 through an aperture in the nacelle 106. For example, the aperture used for allowing a torque shaft to pass from the blade assembly to the rotor of the generator housed within the nacelle 106 may allow the cable 205 to gain access to radar processing equipment in the nacelle 106.

Radar sensor 203 may be a radar sensor capable of receiving radar return signals which may be utilized to generate a map type display and to identify a potential target of surveillance on the map. Further, radar sensor 203 may be configured to receive a radar return signal that may be used for creating an imaging display of a potential target, such as an image generated by synthetic aperture radar (SAR). According to another embodiment, radar sensor 203 may be configured to receive Doppler radar return signals which may be used to provide weather-related information to a map display. In such an embodiment, the ability to generate weather radar information provides control information which is beneficial to control operation of the wind turbine itself, or within the expanded scope of a wind farm. By knowing when a storm is approaching the wind farm before the weather pattern actually arrives, control steps may be taken to protect the structures of the wind turbine 103. For example, propellers may be slowed or blades 107 aimed to a position which protects the blades 107 and wind turbine 103 from excessive winds. Furthermore, if the wind farm is in communication with a power grid containing other power generation sources, notification of an approaching storm, which may decrease the output provided by the wind farm, may be used to increase power from one or more of the other power sources. This in turns helps to maintain a relatively stable power supply to the grid and enables local grid power balancing.

According to an embodiment, more than one type of radar may be used by a particular wind turbine 103. By way of non-limiting example, a wind turbine 103 may be configured to support a radar sensor 203 operating in a conventional S-band Doppler mode at a location on a first blade 107, and support a radar sensor 203 operating in a different radar band, for example, the Ku band, which is capable of detecting wind shears, at a location on a second blade 107 of the wind turbine. The combined attributes of these two radar technologies provide increased warning time of approaching weather systems. The increased warning time provides time to prepare the wind farm for defense against an impending weather event, and further provides the underlying grid and nearby facilities increased lead time to prepare before the effects of a severe weather event are felt. The nearby facilities may include additional power generation facilities, or facilities that provide backup services to the wind farm.

Furthermore, locating near airports wind turbines having multi-mode rotating radars for surveillance, weather and imaging can provide enhanced benefits such as increased power generation and better air traffic control in adverse weather conditions.

Figure 3:
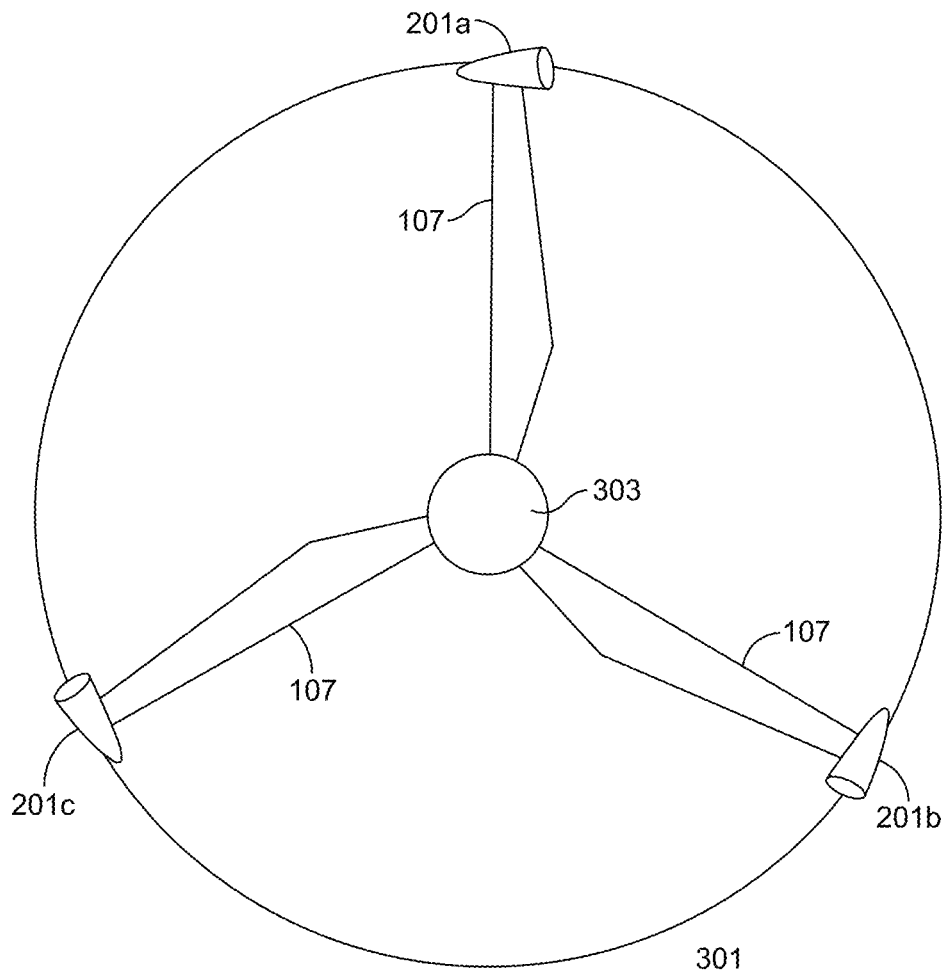
FIG. 3 is an elevation view of the blade assembly of a wind turbine in the radar system of FIG. 2B.

Referring now to FIG. 3, there is shown an elevation view of a rotating blade assembly 300 including a rotationally mounted radar system. The blade assembly 300 includes three blades 107 mounted to a common hub 303. At the tip of each blade 107, a radome 201a, 201b, 201c is mounted and configured to protect a radar sensor housed within the radome 201. The radome 201 is positioned to reduce wind resistance exerted on the radome 201 as the radome 201 rotates about the circumferential path 301 defined by the tip of the blade 107 as the blade 107 rotates about hub 303. As each radar sensor housed within radome 201a, 201b, 201c rotates about path 301, a radar signal is transmitted by the sensor toward a target. The radar signal is impinged by the target and an echo signal is reflected from the target object back toward the radar sensor. The echoed signals are received by the radar sensor and may be stored in memory for later processing as described hereinbelow.

Figure 4:
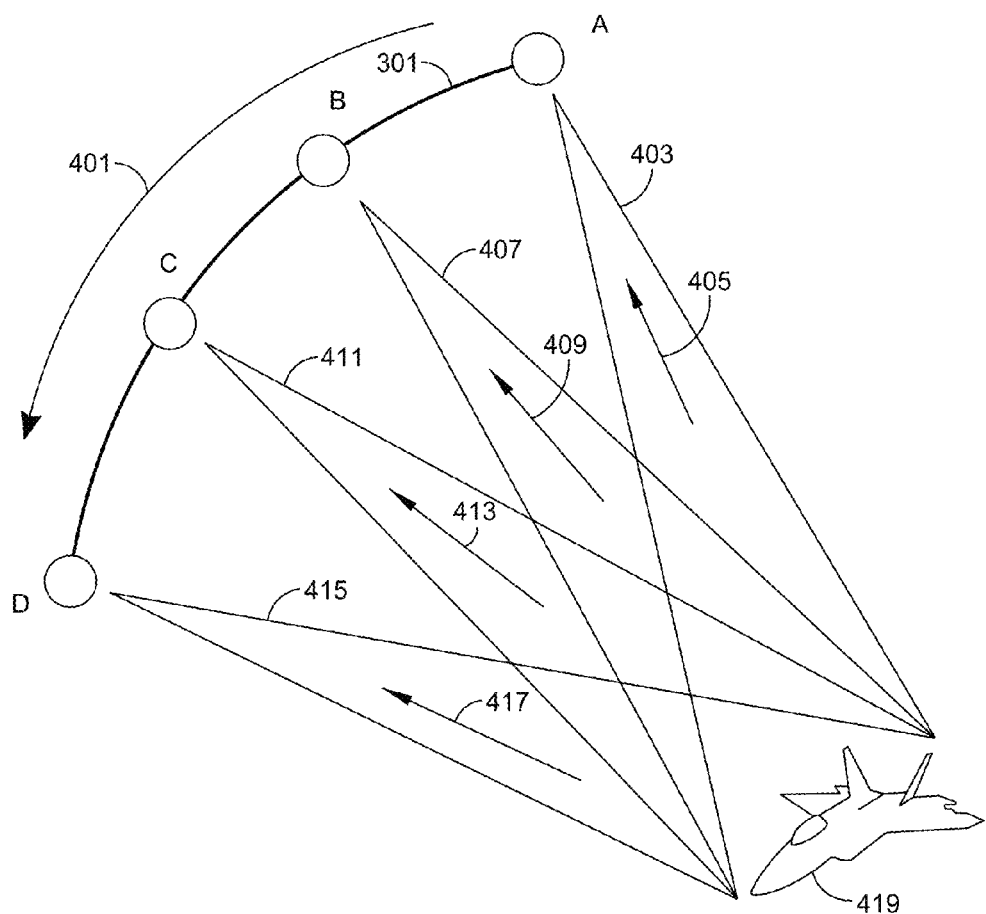
FIG. 4 is an illustration of relative motion between a radar sensor and a target according to an embodiment described herein.

Referring to FIG. 4, an illustration is provided showing radar signals of a rotationally mounted radar sensor. The radar sensor, denoted as circles labeled A, B, C, and D, travels along a circumferential path 301. For example, the circumferential path 301 is defined by the rotational motion of a blade tip of a wind turbine as shown in FIG. 3. As the sensor travels about path 301 in a given rotational direction 401, the sensor will be positioned at point A as some point in the sensor's rotation. As the sensor rotates, the sensor's position will change and move along path 301 until the sensor reaches position B. Similarly, as the sensor continues its rotational motion 401, the sensor will reach position C, and subsequently, position D.

When at position A, the radar sensor transmits a radar signal 403 in the direction of target 419. The radar signal 403 is impinged upon by the target 419 and an echo signal 405 is reflected back towards the radar sensor. The returned signal echo 405 will have properties that are indicative of the nature of the target 419. These properties may include but are not limited to, the round trip time between the transmission of the radar signal 403 and the reception of the echo signal 405, the phase of the received echo signal 405, and the polarization of the received echo signal 405. When the radar sensor is positioned at point B, the radar sensor transmits a radar signal 407 in the direction of target 419. The radar signal 407 reflects off of the target 419 and creates an echo signal 409 which is reflected back to the radar sensor. The echo signal 409 may contain properties indicative of the target 419 as viewed from point B. When the radar sensor is positioned at point C, the radar sensor transmits a radar signal 411 in the direction of target 419. The radar signal 411 reflects off of the target 419 and creates an echo signal 413 which is reflected back the radar sensor. The echo signal 413 may contain properties indicative of the target 419 as viewed from point C. When the radar sensor is positioned at point D, the radar sensor transmits a radar signal 415 in the direction of target 419. The radar signal 415 reflects off of the target 419 and creates an echo signal 417 which is reflected back the radar sensor. The echo signal 417 may contain properties indicative of the target 419 as viewed from point D.

As each echo signal 405, 409, 413, 417 is received by the radar sensor, the characteristics of the echo signal 405, 409, 413, 417 are saved in a memory for subsequent processing. After a selected number of echo signals 405, 409, 413, 417 are received, the characteristics of the echo signals 405, 409, 413, 417 may be processed simultaneously to provide an image based on all of the received signals. In this way, the rotationally mounted radar, using a single radar sensor, acts similarly to a radar system having a multiple sensor array. Due to the relative motion and the resulting change in orientation between the radar sensor and the target 419, the rotationally mounted radar sensor provides a radar aperture that simulates the information obtained from multiple, spatially separated sensors.

Synthetic Aperture Radar (SAR) is a radar system that utilizes relative motion between the radar sensor or antenna and the target. SAR uses motion of the radar sensor relative to the target to take advantage of the Doppler history of the radar echoes generated by the motion of the radar sensor to synthesize or simulate a large antenna or antenna array. Inverse SAR (ISAR) uses relative motion of the target relative to a stationary radar sensor in a similar manner. SAR allows for high resolution imaging using a physically small antenna. As the radar sensor moves, the radar signals are transmitted from varying positions. The return echo signals pass through the radar receiver and are recorded in memory. SAR requires precise location accuracy of the radar sensor during transmitted radar signal. The contribution of each echo signal corresponding to each transmit location is reconstructed and focused to improve resolution significantly over real aperture radar (RAR). The relative velocities between the radar transmitter and the target reflector create Doppler shifts in the stored echo signals. The echo signals are processed according to their Doppler shifts to produce a narrow antenna beamwidth without the need for a physically long antenna.

ISAR is frequently utilized in maritime surveillance for the classification of ships and other objects. An object on water is subject to motion due the wave action of the water in which it is suspended. For example, a ship in water may have a physical feature, like a mast that produces a sinusoidal response to a radar signal that is clearly identifiable in a ISAR image. As the ships rocks toward and away from the radar sensor, an alternating Doppler response is returned. Attempts have been made to adapt ISAR to ground based radar. However, there is difficulty in utilizing ISAR in ground based applications because the object motion is generally far less in magnitude and less periodic that object motion in the maritime scenario.

A radar system having rotationally mounted sensors effectively define a SAR system in which the rotational motion of the sensors (e.g. sensors mounted on the blades of a wind turbine) define a sinusoidal, periodic response having magnitude even greater than a typical maritime target. The regular circular motion of the sensors provide an alternating positive and negative Doppler return as the blades alternately move toward and away from the target. Unlike conventional SAR systems that are mounted on an aircraft or a spacecraft such as a satellite, a ground-based rotationally mounted radar sensor provides a priori knowledge of the precise location of the sensor at any given time. When the precise position of the radar sensors is subject to wind induced turbine blade flex, the position accuracy can be further refined by an Inertial Motion Unit (IMU) co-located with the sensor. Due to the large size of wind turbine structures, a SAR system may provide a very large effective aperture size. For example, a wind turbine having a tower at 120 meters and a blade length of 99 meters, defines a sweep area of 1.9 acres. Utilizing multiple radar sensors across multiple blades, an immense effective aperture may be simulated compared to traditional phased array antennas. In addition to the gains in effective aperture, the wind turbine described above provides an elevation of 219 meters providing a substantial improvement in line of sight compared with conventional surveillance radar towers which may extend vertically about 10-15 meters.

Figure 5:
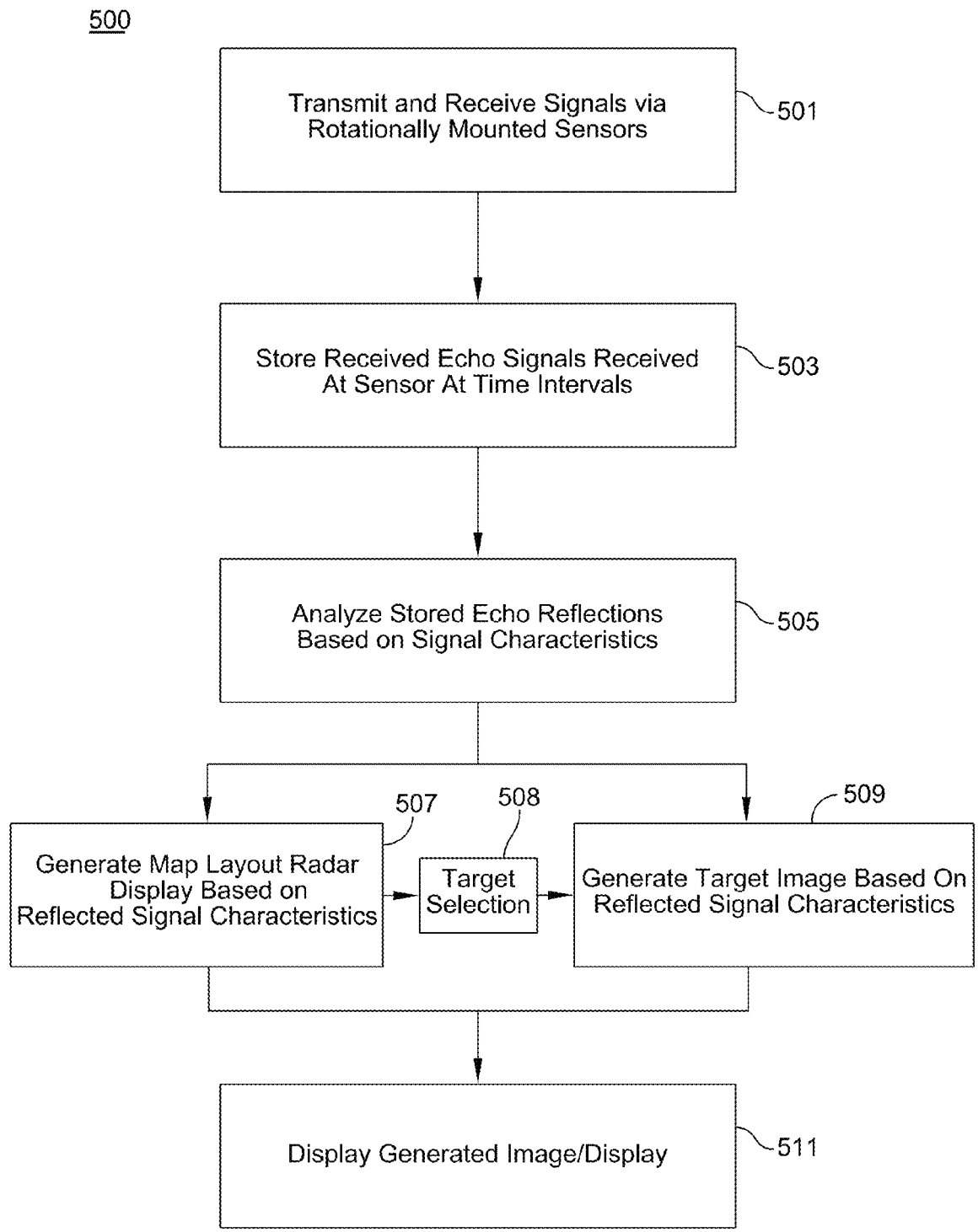
FIG. 5 is a process diagram for operating a rotationally mounted radar system.

FIG. 5 is a process diagram depicting a method 500 for operating a rotationally mounted radar system. A radar sensor is mounted to a rotating structure. For example, the radar sensor may be mounted to a blade of a wind turbine. The radar sensor may be housed in a radome affixed to the blade tip of the wind turbine blade. In addition to or instead of the blade tip, the radar sensor may be mounted at any position along the blade of the wind turbine that provides a rotational motion of the sensor as the blade turns. For example, one or more radar sensors may be disposed on the exterior surface of a blade along its leading edge. The sensor transmits radar signals and receives echo signals of the transmitted signals that are reflected off of potential target objects 501. As the sensor moves rotationally over time, the echo signals received by the sensor at a selected time interval are stored in a memory 503. The stored echo signals are analyzed and processed based on characteristics of the received echo signals 505. By way of non-limiting example, characteristics such as amplitude, phase, polarization and the time the echo was received may be included in the signal processing. Based on the processing of the received echo signals, an image of a potential target object is generated 509. Alternatively, the echo signals may be used to render a radar display in a map layout 507. The map may include echo signal data that represents a potential target. The map layout radar display may be configured to allow a user to select a potential target for imaging 508. Thus, the rotating sensors may be configured to provide surveillance and target imaging functionality. The stored echo signals are correlated and differences between the stored signals are utilized to generate a high resolution image or display 511. For example, SAR processing may be used to generate the image. The generated image is sent to a display or storage device according to conventional communication techniques to display and/or store the generated image. It is to be understood that such signal processing and imaging and display capabilities may be extended to other modes as described herein, such as for example, weather display, wind sheer GMTI, maritime modes such as oil slick detection and drift, and the like. Such extension further includes one or more integrated electro-optical systems (EOS) such as a telescoping system that may be mounted on a structure such as a tower head, by way of non-limiting example.

In an embodiment of a rotationally mounted radar system, the control circuitry and processing of the radar system may be powered through electrical power produced from a wind turbine on which the radar system is mounted. This provides a renewable energy source for powering the radar system and eliminates the need for transporting fuel to a radar installation, especially where access to the radar system may be limited. For example, the logistics of transporting fuel such as diesel fuel to power generators at remote surveillance locations is troublesome because of the cost in transportation as well as the difficulty in reaching the site where access roads may not exist. Providing power for the system directly from the rotational mounting structure eliminates the need to limit placement of the radar installation due to the problems involved in providing reliable power to the radar system.

Figure 6:
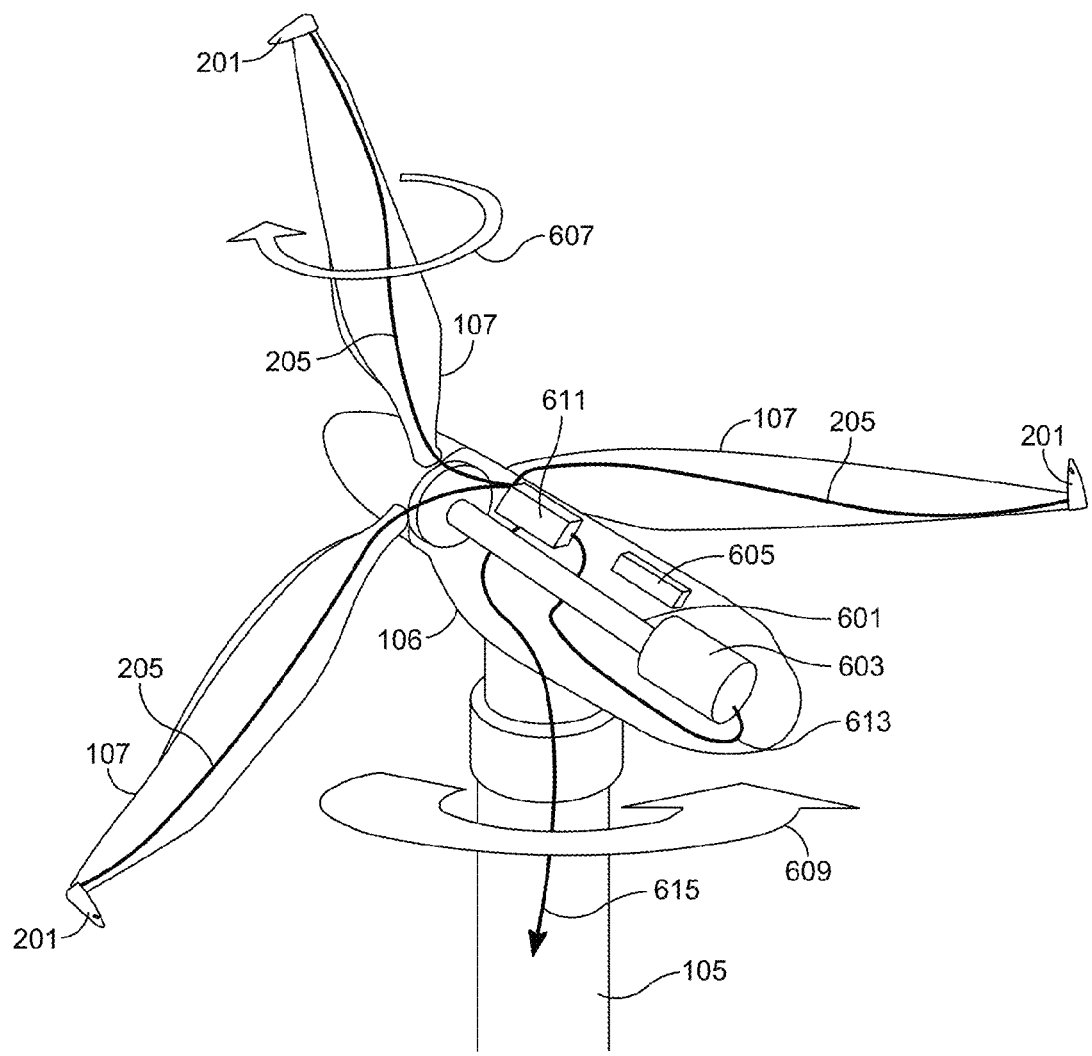
FIG. 6 is a perspective view in phantom of a wind turbine and rotationally mounted radar system.

FIG. 6 is a perspective view shown in phantom of an embodiment of radar system 600 rotationally mounted on a wind turbine. The wind turbine is mounted on a mast 105 which supports the nacelle 106. The nacelle 106 provides a housing which contains the mechanical and control machinery for the wind turbine and the radar system 600. The wind turbine has three blades 107, each blade having a radome 201 affixed at its tip. The radome contains a radar sensor that transmits and/or receives radar signals. The sensor is in electrical communication with the radar control and processing circuitry 611 through a communication cable 205 or other suitable link. The control and processing circuitry includes one or more processors and memory for transmitting and/or receiving signal data and processing the data using SAR and ISAR algorithms and techniques for performing threat detection and target discrimination by obtaining three dimensional imaging. The blades 107, when acted on by force generated by air movements flowing past the blades 107, rotate about an axis that is aligned substantially along the longitudinal axis of the nacelle 106. The rotational energy of the turning blades is transmitted through a torque shaft 601 which is further coupled to a generator 603.

The wind turbine includes a controller 605 which provides control of the operation of the wind turbine. For example, the controller 605 may receive input data from a wind vane or anemometer (not shown) to determine the direction or speed of the prevailing winds. Based on the input data, the controller 605 generates a control signal that is transmitted to an actuator that may control the pitch of the blades 107 as indicated by arrow 607. The controller 605 may also generate a control signal that controls an actuator that provides yaw by rotating the nacelle 106 about mast 105 as indicated by arrow 609. Controller 605 includes a processor configured for receiving input from components of the wind turbine and radar system and processing the inputs to provide control signals that are operative to control aspects of the radar system, such as transmit and receive power, image generation, signal processing of echo signals received by the radar sensor and other functions known in the art used to operate a wind turbine and/or radar system.

The function of generator 603 is to generate electric power from the rotation of the blades 107 resulting from force applied by the wind. This creates a sustainable source of green energy. Radar is a power centric application, characterized by the fact that when power to the radar is increased, the effective range of the radar is also increased. A ground based radar system may consume power of about 10 kiloWatts (kW) to about 100 kW. A large wind turbine is capable of generating electric power of more than 100 kW. Thus, a radar system rotationally mounted on a wind turbine may be power independent. When wind conditions are such that the wind turbine is unable to generate power from the force of the wind, backup power systems may be provided to keep the radar system operational. For example, battery power may be used to position the blades and attached radar sensors in azimuth by controlling the yaw control 609 actuator. Alternatively, the auxiliary power may provide rotation of the blades 107 when the current wind conditions are not sufficient to provide rotation. In addition or as an alternative to battery power, the wind turbine and radar system may be connected to a power distribution grid which may provide power for blade rotation or yaw control during times of poor wind conditions. The auxiliary power feature may also be used to selectively position the turbine blades perpendicular to the wind direction, for the benefit of imaging a target at the expense, at least temporarily, of generating power.

The radar control and processing circuitry 611 may be electrically coupled 613 to generator 603 and configured to receive electrical power for generating radar signals via the rotationally mounted sensors, and for powering processing circuitry for processing received signals and providing imaging data based on the received signals. The blades 107 rotate providing rotational movement of radomes 201 and the radar sensors housed therein. The radar sensors transmit radar signals as they rotate and receive echo signals from target objects which impinge on the transmitted radar signals. The echo signal data is stored in memory. For example, the echo signal data may be stored in a memory integrated as part of radar control and processing circuitry 611. In one configuration, a rotary joint (not shown) is disposed between the radar sensors on blade 107 and processing circuitry 611. The rotary joint permits the blade assembly to rotate while transmitting power from the control circuitry to the radar sensors via the blade 107, and provides a path for signals received by the sensor to be provided to the processing circuitry. The rotary joint may include conductive brushes which conduct electrical energy received from a source node to a target node via an associated rotating conductive surface disposed within the torque shaft 601 which is in contact with the at least one of the brushes. By way of non-limiting example, the rotary joint and brushes may be configured to provide one or more of power and high frequency communications data (e.g. via 802.11 protocol). Power may be transmitted from the turbine housing to the blades as well as radio based signals to transmit high frequency control and radar signals to/from the blades to the radar control and processing circuitry. The stored echo signal data is processed, for example, the echo signal data may be processed as SAR data, to generate imaging data of the target object. The generated image is then sent to a display or storage device which may be remote from the wind turbine. The generated image of the target object may then be viewed on a remote display or retrieved from memory and viewed at a later time.

According to an embodiment of a rotationally mounted radar system, a complement of different frequency radar signals may be utilized to provide simultaneously imaging, weather and surveillance capabilities. Higher frequencies provide better results for imaging or weather related radar applications. Lower frequencies provide greater range per unit of power consumed for surveillance applications. Referring again to FIG. 2A, radome 201a may be configured to house a radar sensor that transmits radar signals in the X-band. Radome 201b may be configured to transmit radar signals in a second frequency band. For example, radome 201b may house a radar sensor that transmits radar signals in the Ku-band. Radome 201c may house a radar sensor configured to transmit radar signals in the L, S, or C band. By utilizing complementary radar frequencies, the coverage of the radar installation is maximized providing simultaneous imaging and surveillance.

In addition to mounting radar sensors on rotating blades at their tips, multiple radar sensors may be mounted at multiple positions along the length of the rotating blade. This arrangement increases the number of viewing angles for a particular target objects and provides the capability to process a 3-dimensional image of the target object. Through 3-dimensional integration of echo signals received from multiple locations, the resolution achievable extends beyond the fidelity of images generated through ISAR/SAR. To provide 3-dimensional imaging capabilities, multiple radar sensors may be installed on multiple turbine blades in an integrated manner. This results in a synthetic aperture having a size defined by the entire sweep area of the blades as opposed to the swept arc defined by the path of the blade tips. Higher resolution imaging in this manner provides increased abilities for threat detection. For example, a large target object detected travelling at 500 knots is probably an airplane, but a small object traveling at that speed without a transponder is more likely a missile. The variation in perspective provided by the varying positioned radar sensors may provide further identification advantages. For example, a detected object may be discerned as a lone aircraft or a formation of aircraft based on the ability to view the object from varying perspectives. Thus, there is disclosed a rotatably mounted radar system comprises a wind turbine having a hub and a plurality of blades extending therefrom; a radar antenna configured to transmit and/or receive a radio frequency (RF) signal; and a processor in electrical communication with the radar antenna and configured to generate the RF signal for transmission and/or to process the received RF signal; wherein the radar antenna is affixed to one of the plurality of blades of the wind turbine such that relative motion is defined between the radar antenna and a target within a line of sight of the radar antenna.

Thus, there has been disclosed a blade mounted radar system comprising: a wind turbine having a hub and a plurality of blades extending therefrom; a radar antenna configured to transmit and/or receive a radio frequency (RF) signal; and a processor in electrical communication with the radar antenna and configured to generate the RF signal for transmission and/or to process the received RF signal; wherein the radar antenna is affixed to one of the plurality of blades of the wind turbine such that relative motion is defined between the radar antenna and a target within a line of sight of the radar antenna. In an embodiment, a second radar antenna may be configured to transmit and receive an RF signal, wherein the second radar antenna is mounted to a second one of the plurality of blades of the wind turbine. The first radar antenna may be configured to transmit and/or receive an RF signal at a first frequency, and the second radar antenna may be configured to transmit and/or receive an RF signal at a second frequency different from the first frequency. A generator may be coupled to the wind turbine and configured to generate electric power, wherein the generator is electrically coupled to the processor and configured to provide power to operate the processor. In one embodiment, the generator may be configured to generate electric power between about 10 kiloWatts (kW) and about 100 kW. In one embodiment the first radar antenna may be configured to operate in X frequency band, and the second radar antenna may be configured to operate in Ku frequency band. Each of the first and second radar antennas may be affixed at a distal end of the corresponding blade relative to the hub.

Further embodiments of the present invention disclose a method comprising: affixing at least one radar antenna to a corresponding one of a plurality of blades of a wind turbine having a hub and with the plurality of blades extending therefrom; the radar antenna configured to transmit and/or receive a radio frequency (RF) signal; and processing radar signals transmitted and/or received via the radar antenna for detecting an airborne target; the radar antenna being affixed to the one of the plurality of blades of the wind turbine such that relative motion is defined between the radar antenna and the target within a line of sight of the radar antenna. The radar antenna may be affixed at a distal end of the corresponding blade relative to the hub. In one embodiment the step of affixing at least one radar antenna to a corresponding one of the plurality of blades of the wind turbine comprises affixing to a distal end of one of the plurality of blades a first radar antenna configured to operate in a first frequency band, and affixing to a distal end of another of the plurality of blades a second radar antenna configured to operate in a second frequency band different from the first frequency band. In one embodiment, the first frequency band is the X frequency band, and the second frequency band is the Ku frequency band.

Further embodiments of the present invention disclose a radar wind turbine apparatus comprising: an electric generator in electrical communication with a power grid associated with the wind turbine; a torque shaft extending from a rotor of the electric generator; a blade assembly coupled to the torque shaft, the blade assembly comprising: a central hub comprising a rotational joint, the hub coupled to the torque shaft; a plurality of blades, each blade coupled to the central hub; and at least one radar sensor disposed on or in one of the plurality of blades. The apparatus further comprises a controller configured to control operation of the wind turbine, where the controller is in communication with the at least one radar sensor via the rotational joint in the torque shaft, and wherein the at least one radar sensor includes an antenna configured to send and/or receive a radar signal based on commands received from the controller. In one embodiment at least two radar sensors are disposed on one or more of the plurality of blades, wherein a first radar sensor is configured to send and/or receive radar signals in a first radar band, and a second radar sensor is configured to send and/or receive radar signals in a second radar band different from the first radar band. In one embodiment the first radar band is S-band Doppler radar for detecting weather, and the second radar band is Ku band for detecting wind shear. In one embodiment the first radar band is configured to provide radar surveillance, and the second radar band is configured to detect weather. The controller may be configured to be in communication with the power grid. The power grid may comprise at least one other power source, wherein if the wind turbine detects an approaching severe weather event, the controller is configured to provide a signal to the power grid indicative of the weather event and of measures to secure the wind turbine. The signal provided to the power grid may include an instruction to increase power output from the at least one other power source. The measures to secure the wind turbine may include slowing a rotation of the blade assembly and/or turning the blade assembly to a direction relative to a prevailing wind direction. In one embodiment, the first radar band is configured to provide radar surveillance and the second radar band is configured to provide radar imaging. In an embodiment, the radar imaging is performed on a selected target, the target selected by a user based on a map display of information based on the radar surveillance. At least one radome may be disposed at a tip of one of the plurality of blades, with at least one radar sensor housed within the at least one radome. In one embodiment, at least one radar sensor is disposed on an exterior surface of one of the plurality of blades. The at least one radar sensor may be disposed on a leading edge of the blade.

While the foregoing invention has been described with reference to the above-described embodiments, various modifications and changes can be made without departing from the spirit of the invention. For example, while embodiments of the invention illustrate a radar dome on a given blade tip of a wind turbine, such embodiments may be extended to include one or more radar antenna phased arrays and/or line array panels extending from the tip of the blade toward the center to a given specified length. Such structures may be configured with or without a dome, as conformal arrays (e.g. taking the shape of the blade on the tip), and the like. Furthermore, different frequency bands or radar types may be integrated into or on the different blade-tips. Such radar configurations may include X-band imaging type radar for primary ISAR/SAR imaging functions while implementing an L, S, or C Band radar for another tip that would primarily gain the elevation LOS for surveillance modes. Such may be configured without utilizing SAR but rather an adapted Doppler for weather functions. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A blade mounted radar system comprising:
   a wind turbine having a hub and a plurality of blades extending therefrom;
   a radar antenna configured to transmit and/or receive a radio frequency (RF) signal; and
   a processor in electrical communication with said radar antenna and configured to generate the RF signal for transmission and/or to process the received RF signal;
   wherein said radar antenna is affixed to one of the plurality of blades of the wind turbine such that relative motion is defined between said radar antenna and a target within a line of sight of said radar antenna.

2. The system of claim 1, further comprising:
   a second radar antenna configured to transmit and receive an RF signal, wherein said second radar antenna is mounted to a second one of said plurality of blades of said wind turbine.

3. The system of claim 2, wherein said first radar antenna is configured to transmit and/or receive an RF signal at a first frequency, and said second radar antenna is configured to transmit and/or receive an RF signal at a second frequency different from said first frequency.

4. The system of claim 1 further comprising:
   a generator coupled to said wind turbine and configured to generate electric power; wherein said generator is electrically coupled to said processor and configured to provide power to operate said processor.

5. The system of claim 4, wherein said generator is configured to generate electric power between about 10 kiloWatts (kW) and about 100 kW.

6. The system of claim 2, wherein said first radar antenna is configured to operate in X frequency band, and said second radar antenna is configured to operate in Ku frequency band.

7. The system of claim 2, wherein each of said first and second radar antennas is affixed at a distal end of the corresponding blade relative to the hub.

8. A method comprising:
   affixing at least one radar antenna to a corresponding one of a plurality of blades of a wind turbine having a hub and with said plurality of blades extending therefrom; the radar antenna configured to transmit and/or receive a radio frequency (RF) signal; and
   processing radar signals transmitted and/or received via said radar antenna for detecting an airborne target; said radar antenna being affixed to said one of the plurality of blades of the wind turbine such that relative motion is defined between said radar antenna and said target within a line of sight of said radar antenna.

9. The method of claim 8, wherein said radar antenna is affixed at a distal end of the corresponding blade relative to the hub.

10. The method of claim 8, wherein the step of affixing at least one radar antenna to a corresponding one of the plurality of blades of the wind turbine comprises affixing to a distal end of one of said plurality of blades a first radar antenna configured to operate in a first frequency band, and affixing to a distal end of another of said plurality of blades a second radar antenna configured to operate in a second frequency band different from said first frequency band.

11. The method of claim 10, wherein said first frequency band is the X frequency band, and said second frequency band is the Ku frequency band.

12. A radar wind turbine apparatus comprising:
   an electric generator in electrical communication with a power grid associated with the wind turbine;
   a torque shaft extending from a rotor of said electric generator;
   a blade assembly coupled to said torque shaft, said blade assembly comprising:
      a central hub comprising a rotational joint, said hub coupled to said torque shaft;
      a plurality of blades, each blade coupled to said central hub; and
      at least one radar sensor disposed on or in one of said plurality of blades.

13. The apparatus of claim 12, further comprising:
   a controller configured to control operation of said wind turbine, said controller in communication with the at least one radar sensor via said rotational joint in said torque shaft, wherein said at least one radar sensor includes an antenna configured to send and/or receive a radar signal based on commands received from said controller.

14. The apparatus of claim 13, further comprising at least two radar sensors disposed on one or more of said plurality of blades, wherein a first radar sensor is configured to send and/or receive radar signals in a first radar band, and a second radar sensor is configured to send and/or receive radar signals in a second radar band different from said first radar band.

15. The apparatus of claim 14, wherein said first radar band is S-band Doppler radar for detecting weather, and said second radar band is Ku band for detecting wind shear.

16. The apparatus of claim 14, wherein said first radar band is configured to provide radar surveillance, and said second radar band is configured to detect weather.

17. The apparatus of claim 16, wherein said controller is in communication with said power grid, wherein said power grid comprises at least one other power source, and wherein if the wind turbine detects an approaching severe weather event, said controller is configured to provide a signal to said power grid indicative of the weather event and of measures to secure said wind turbine.

18. The apparatus of claim 17, wherein the signal provided to the power grid includes an instruction to increase power output from the at least one other power source.

19. The apparatus of claim 17, wherein said measures to secure said wind turbine include slowing a rotation of said blade assembly and/or turning said blade assembly to a direction relative to a prevailing wind direction.

20. The apparatus of claim 14, wherein said first radar band is configured to provide radar surveillance and said second radar band is configured to provide radar imaging.

21. The apparatus of claim 20, wherein said radar imaging is performed on a selected target, said target selected by a user based on a map display of information based on the radar surveillance.

22. The apparatus of claim 12, further comprising at least one radome, said radome disposed at a tip of one of said plurality of blades, said at least one radar sensor being housed within said at least one radome.

23. The apparatus of claim 12, wherein said at least one radar sensor is disposed on an exterior surface of one of said plurality of blades.

24. The apparatus of claim 23, wherein said at least one radar sensor is disposed on a leading edge of said blade.

* * * * *